Dec. 30, 1924.
E. CLICKNER
FISHING REEL
Filed Jan. 13, 1923
1,521,229
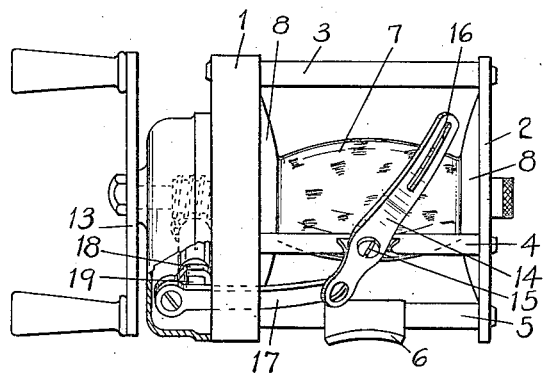
Fig. I.
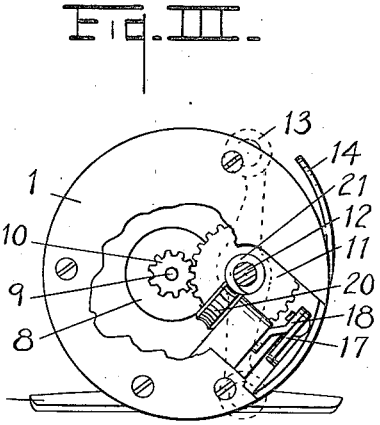
Fig. III.
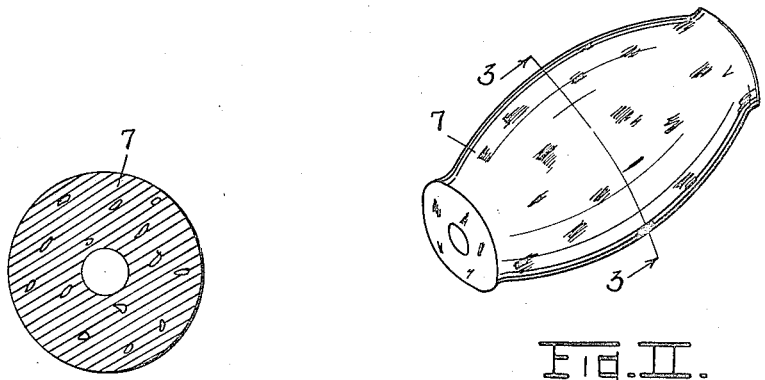
Fig. II.
Fig. IV.
Earle Clickner
INVENTOR.
Chappell T Earl
ATTORNEYS Patented Dec. 30, 1924.

1,521,229

UNITED STATES PATENT OFFICE.

EARLE CLICKNER, OF KALAMAZOO, MICHIGAN, ASSIGNOR TO SHAKESPEARE COMPANY, OF KALAMAZOO, MICHIGAN.

FISHING REEL.

Application filed January 13, 1923. Serial No. 612,454.

*To all whom it may concern:*

Be it known that I, EARLE CLICKNER, a citizen of the United States, residing in the city and county of Kalamazoo, State of Michigan, have invented certain new and useful Improvements in Fishing Reels, of which the following is a specification.

This invention relates to improvements in fishing reels.

The main objects of this invention are:

First, to provide an improved fishing reel of the "level wind" type in which the parts are simple and economical in structure and very durable.

Second, to provide an improved reel of this class in which the line is effectively traversed or delivered to the barrel of the spool, the barrel of the spool being shaped to compensate for variations in the movement of the line traversing means.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side elevation of my improved fishing reel, a portion of the gear housing being sectioned and broken away to disclose the mechanism therein.

Fig. II is a perspective view of the barrel of the spool, the flanges and shaft being omitted.

Fig. III is a cross section through the barrel of the spool on a line corresponding to line 3—3 of Fig. II.

Fig. IV is an end elevation looking from the left of Fig. I, the housing being partially broken away, the driving crank shaft being shown in section and the crank thereon in dotted lines.

In the drawings similar reference characters refer to similar parts throughout the several views.

Referring to the drawings, 1 represents the chambered head of the reel and 2 the tail plate thereof. These head and tail plates are the end members of the frame and are connected by pillars 3, 4 and 5, the reel clip plate 6 being carried by the pillars 5. The spool is provided with an oppositely tapered barrel-shaped barrel 7, preferably as illustrated, with flanges 8 at the ends thereof. The shaft 9 of the spool projects into the housing 1 and is provided with a pinion 10 which meshes with the gear 11 on the crank shaft 12 which is provided with a crank 13.

On the pillar 4 I mount a line traversing or line guide lever 14, the lever being pivoted at 15 and having an elongated eye 16 therein to receive the line. This lever is connected by the link 17 to the crank arm 18 on the shaft 19 carrying the worm 20 meshing with the worm 21 on the crank shaft 12. By this driving connection the traversing lever is actuated or reciprocated in proper synchronism with the spool. Owing to the driving connections, that is, the crank arm and link connection for the lever, the lever is driven with a variable speed which decreases as the lever approaches its reversing points or the ends of its stroke, this being occasioned by the fact that the crank arm is traveling in the up and down arcs of its stroke. As the speed of the spool remains relatively constant there would be a tendency for the line to pile up at the ends of the spool. This is counteracted by the shape of the barrel of the spool, which is preferably barrel-shaped, as I have illustrated, although its exact conformation might be varied.

I have illustrated and described my improvements in the form or embodiment which I have found very practical. I have not attempted to illustrate or describe certain modifications and adaptations in the form of the traversing means which I contemplate, as I believe the disclosure made will enable those skilled in the art to which my invention relates to embody or adapt the same as may be desired.

Having thus described my invention, what I claim as new and desire to secure by Letters Patent, is:

1. In a fishing reel, the combination of a frame, a spool provided with a barrel-shaped barrel, a crank shaft, driving connections for said crank shaft to said spool, a line traversing lever pivotally mounted on said frame and having an elongated line guide eye therein, means for actuating said lever comprising a crank arm, driving connections for said crank arm to said crank shaft, and a link connecting said crank arm to said lever.

2. In a fishing reel, the combination of a frame, a spool provided with a barrel tapered from its center towards each end, a crank shaft, driving connections for said crank shaft to said spool, a line traversing lever pivotally mounted on said frame and having a line guide eye therein, means for actuating said lever comprising a crank arm, driving connections for said crank arm to said crank shaft, and a link connecting said crank arm to said lever.

3. In a fishing reel, the combination of a frame, a spool provided with a barrel-shaped barrel, a crank shaft, driving connections for said crank shaft to said spool, a reciprocating line traversing member mounted in said frame, means for actuating said line traversing member comprising a crank arm, driving connections for said crank arm to said crank shaft, and a link connecting said crank arm to said line traversing member.

4. In a fishing reel, the combination of a frame, a spool provided with a barrel tapered from its center towards each end, a crank shaft, driving connections for said crank shaft to said spool, a reciprocating line traversing member mounted on said frame, means for actuating said line traversing member comprising a crank arm, driving connections for said crank arm to said crank shaft, and a link connecting said crank arm to said line traversing member.

5. In a fishing reel, the combination with a frame, a spool provided with a barrel-shaped barrel, a line traversing lever pivotally mounted on said frame, means for actuating said lever comprising a driven crank arm connected to said lever by a link whereby the line guide lever is reciprocated at a speed decreasing as the lever approaches the ends of its stroke, and means for driving said spool operatively associated with said crank arm driving mechanism.

6. In a fishing reel, the combination with a frame, a spool provided with a barrel tapered from its central point towards each end, a reciprocating line traversing member mounted on said frame, means for actuating said line traversing member comprising a driven crank arm connected to said lever by a link whereby the line traversing member is driven with a speed decreasing as the member approaches the ends of its stroke, and means for driving said spool operatively associated with said crank arm driving mechanism.

7. In a fishing reel, the combination of a frame, a spool provided with a barrel tapered toward each end, a reciprocating line traversing member operatively associated with said spool, means for driving said line traversing member at a speed decreasing as it approaches its reversing points, and driving means for said spool operatively associated with said line traversing driving means.

8. In a fishing reel, the combination of a frame, a spool provided with a barrel having oppositely tapered portions, a reciprocating line traversing member operatively associated with said spool, means for driving said line traversing member at variable speeds, and means for driving said spool in synchronism with the full strokes of said line traversing means.

9. In combination with a reel, a line distributing device therefor connected to operate with rotation of the reel, means for operating said distributing device to impart thereto a variable speed movement, and compensatory means associated with the reel for building toward a uniform diameter thereon the line windings which are guided by the distributing device, substantially as described.

In witness whereof, I have hereunto set my hand and seal.

EARLE CLICKNER. [L. S.]